Jan. 16, 1951   F. SCHWARZER   2,538,052
FISHHOOK
Filed May 5, 1949
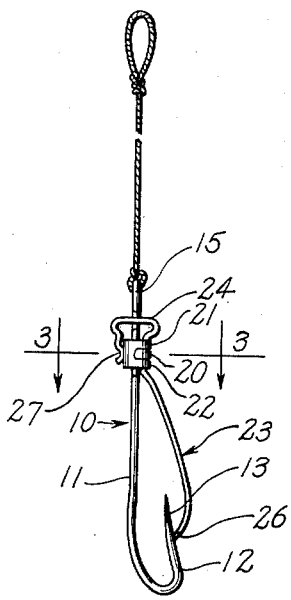
Fig. 1
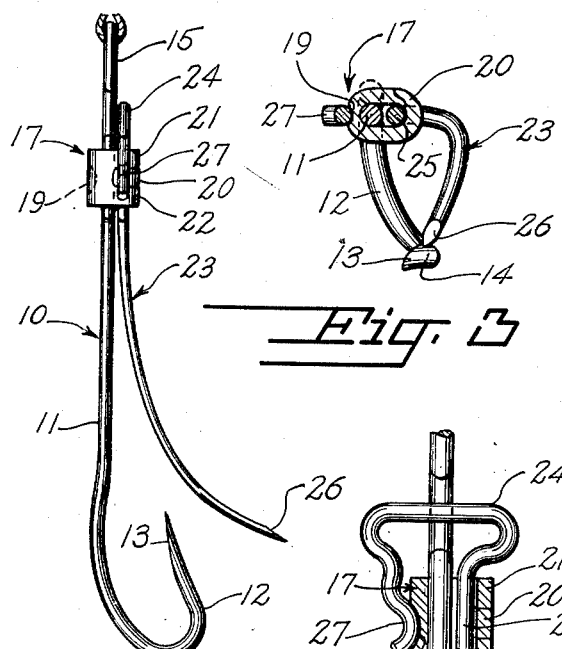
Fig. 2     Fig. 3
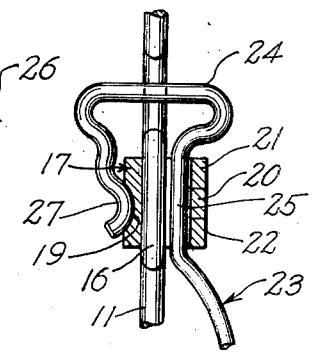
Fig. 4
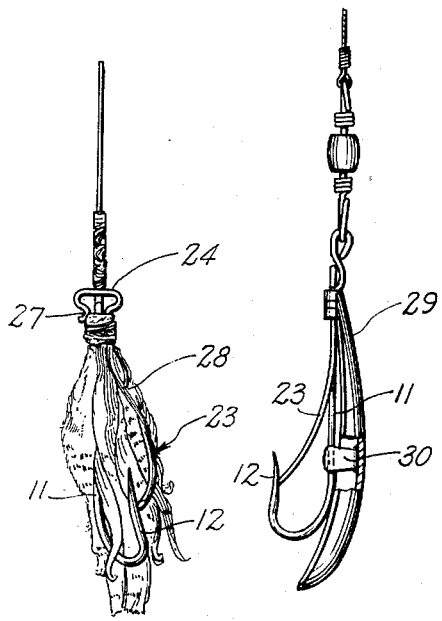
Fig. 7   Fig. 8
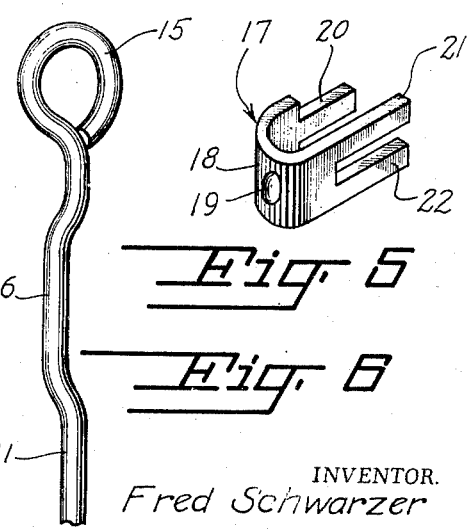
Fig. 5
Fig. 6
INVENTOR.
Fred Schwarzer
BY
Christian R. Nielsen
Attorney Patented Jan. 16, 1951

2,538,052

UNITED STATES PATENT OFFICE 2,538,052

FISHHOOK

Fred Schwarzer, Pottstown, Pa.

Application May 5, 1949, Serial No. 91,465

1 Claim. (Cl. 43—42.43)

This invention relates to a fish hook, and it consists in the constructions, arrangements and combinations herein described and claimed.

It is a particular object of the invention to provide a fish hook wherein the usual barb as employed in conventional fish hooks is eliminated, and in place thereof a bait and fish retaining element is employed co-operable with the hook for retaining the bait and fish when engaged on the hook.

It is a still further object of the invention to provide a fish hook embodying features somewhat similar to that disclosed in my pending application, filed April 22, 1947, bearing Serial Number 743,050, and is particularly directed to the simplification in structure as well as the mounting of the retaining element and the hook, the mounting and retaining element including a simplified detent means for securing the retaining element in releasable operative position with respect to the hook.

Additional objects, advantages and features of invention will be apparent from the following description and accompanying drawing, wherein:

Figure 1 is a front elevation of the hook constructed in accordance with the invention, illustrating the retaining element in closed or operative position;

Figure 2 is a similar enlarged view illustrating the retaining element in open position;

Figure 3 is an enlarged cross section on the line 3—3 of Figure 1;

Figure 4 is an enlarged fragmentary sectional view illustrating the mounting of the retaining element upon the shank of the hook;

Figure 5 is a perspective view of the mounting means;

Figure 6 is a fragmentary perspective view of the upper portion of the shank of the hook;

Figure 7 is a front elevation illustrating a hook incorporated with a conventional fishing fly; and, Figure 8 is a front elevation, partly in section, illustrating a hook as incorporated in a conventional form of spoon.

Attention is now invited particularly to Figures 1 and 2 wherein a hook generally indicated at 10 is shown, consisting of a shank 11 formed from steel wire, the lower end of which is bent to form a hook 12 having a sharpened end 13, the latter having a slight curvature outwardly from the longitudinal plane of the hook 12, as clearly shown at 14 in Figure 3.

The upper end of the shank 11 terminates in an eyelet 15 and a short distance below the eyelet, the shank is formed with a portion 16 offset to one side of the longitudinal axis of the shank, defining a seat for a mounting collar 17, now to be described, attention being invited to Figure 5 of the drawing. The collar 17, prior to assembly upon the shank, is of U-shaped formation, the outer face of the bight portion 18 being formed with a recess 19, for a purpose presently to be explained. A leg 20 is integrally formed upon one side of the collar and extends from one side of the bight portion 18, being medially located so as to interleave with a pair of legs 21 and 22 when assembled upon the shank 11. The retaining element 23 is formed from a single strand of steel wire bent adjacent one end to form an open loop 24, the strand being inwardly offset with respect to the horizontal axis of the loop to form a bearing 25 and therebelow the strand is given a curvature longitudinally of its length in the direction of the pointed end 26, so that the end 26 will occupy a position in close relation to the hook 12 when assembled. The upper end of the strand below the loop 24 is formed with an inturned portion 27 adapted to releasably seat within the recess 19.

In assembling the hook and retaining means, the shank 11 is positioned within the bight 18 with the portion 16 of the shank embraced therein. The retainer member 23 is then engaged between the arms 20, 21 and 22 with the bearing 25 positioned thereadjacent and the arms 20, 21 and 22 are bent thereupon in an interleaved relation to secure the retainer and shank of the hook within the collar. The inturned portion 27 will be so constructed as to have a frictional engagement with the recess 19, yet may be readily releasable therefrom upon exerting the proper pressure on the loop 24 to present the retaining element 23 in the open position shown in Figure 2. A reverse pressure will return the retaining element to the closed position shown in Figure 1.

In Figure 7 the hook is shown incorporated in a fly indicated at 28, and in Figure 8 the hook is shown mounted in a spoon 29, and in the latter instance, it may be found desirable to secure the shank 11 of the hook to the spoon by means of a lug 30 which may be soldered or brazed to the spoon.

The end 26 of the retaining element 23 will not obstruct the swallowing of the hook by a fish and when the fish pulls on the line connected to the hook, the pointed end 26 will function as a barb to prevent accidental release of the fish. To release the fish from the hook, the retainer element is simply moved to the position shown in Figure 2. The hook 12 may then be re-baited, the retainer 23 returned to closed position shown in Figure 1, in readiness for casting the line.

While I have shown and described a preferred form of the device, this is by way of illustration only, and I consider as my own all such modifications in construction as fairly fall within the scope of the appended claim.

What I claim:

A fish hook comprising a shank having a hook member formed at one end, said shank having a portion offset from the longitudinal axis thereof, a bait and fish retaining member formed from a strand of resilient steel wire having a pointed end, said wire having a curvature to present the pointed end adjacent said hook member, said retaining member further having a bearing portion aligned with the offset portion of the shank, a collar encircling said offset portion and the bearing portion in such a manner as to secure the offset portion against movement, said bearing portion being turnably mounted in said collar, said retaining member having a loop formed adjacent its other end with an inturned portion therebeneath, and said inturned portion being of a length to engage said collar and seat within a recess formed in said collar.

FRED SCHWARZER.

REFERENCES CITED

The following references are of record in the file of this patent:

UNITED STATES PATENTS

| Number | Name | Date |
| --- | --- | --- |
| 989,392 | Mueller | Apr. 11, 1911 |
| 1,544,034 | Ratcliff | June 30, 1925 |
| 2,275,984 | Nitchman | Mar. 10, 1942 |